US007436952B2

(12) United States Patent
Darbut

(10) Patent No.: US 7,436,952 B2
(45) Date of Patent: Oct. 14, 2008

(54) EARSET MICROPHONE

(75) Inventor: Alexander L. Darbut, Edina, MN (US)

(73) Assignee: IntriCon Corporation, Arden Hills, MN (US)

( * ) Notice: Subject to any disclaimer, the term of this patent is extended or adjusted under 35 U.S.C. 154(b) by 548 days.

(21) Appl. No.: 11/274,770

(22) Filed: Nov. 15, 2005

(65) Prior Publication Data

US 2007/0116315 A1 May 24, 2007

(51) Int. Cl.
*H04M 1/00* (2006.01)
*H04M 9/00* (2006.01)
*H04R 25/00* (2006.01)

(52) U.S. Cl. ........................ 379/430; 381/374; 381/375

(58) Field of Classification Search ................. 379/430; 381/309, 330, 370–379, 381, 384, 386; 181/128
See application file for complete search history.

(56) References Cited

U.S. PATENT DOCUMENTS 4,917,504 A * 4/1990 Scott et al. .................. 381/381
6,097,827 A * 8/2000 Yang .......................... 381/375
6,154,539 A * 11/2000 Pitel ........................... 379/430
6,233,344 B1 5/2001 Clegg et al. ................. 381/374

FOREIGN PATENT DOCUMENTS

| | | |
|---|---|---|
| EP | 0 690 654 A2 | 6/1995 |
| WO | WO99/08477 | 2/1999 |

* cited by examiner

*Primary Examiner*—Curtis Kuntz
*Assistant Examiner*—Tuan D Nguyen
(74) *Attorney, Agent, or Firm*—Westman, Champlin & Kelly, P.A.; Z. Peter Sawicki

(57) ABSTRACT

An earset microphone includes an earpiece having a wedge portion wherein the wedge portion is positioned between a back side of the ear and a scalp to secure the earpiece in a selected position. A mounting bracket is positioned within the wedge portion. A boom is secured to the mounting bracket and extends from the earpiece such that the boom positions from below an ear lobe towards a mouth of the speaker. A microphone is positioned at the distal end of the boom proximate the speaker's mouth such that the microphone converts the speaker's voice into an electronic signal. An end of a cable is secured to the mounting bracket such that the cable remains secured to the mounting bracket during use and wherein the cable transfers the signal from the microphone to an external component.

20 Claims, 10 Drawing Sheets

EARSET MICROPHONE

BACKGROUND OF THE INVENTION

The present invention relates to a microphone. More particularly, the present invention relates to an earset microphone.

Microphones are used in many applications where a speaker's voice or a performer's voice requires amplification. In many theatric performances or concerts, the performer requires that his/her voice be amplified while the performer moves or performs on stage.

A hand held microphone that is hard wired to an amplifier with a cord limits the distance that the performer can move about the stage because the cord has a fixed length. The cord may also be a tripping hazard for the performer. Even when the performer uses a wireless hand held microphone that transmits signals to an amplifier, the performer must grip the microphone with at least one hand which may limit her/her ability to perform.

Performing artists are beginning to use small, lightweight microphones that include an internal power source such as a dry cell battery. As the microphones become smaller, a beneficial effect is that the audience may not be able to see the microphone, such that the microphone does not detract from the performer's appearance. Additionally, a lightweight, smaller microphone enables the performer to utilize all of his/her ability to entertain because the performer's focus is not distracted by the microphone.

Some of the first lightweight microphones that were used by performers were clipped to the performer's clothing, such as a Lavalier microphone. However, at times the clothing would rub against the microphone resulting in the performer's voice being distorted. Additionally, the microphone could unknowingly become unfastened from the clothing resulting in the performer's voice being unamplified due to the increased distance between the microphone and the performer's mouth.

To overcome the problems associated with Lavalier style clip-on wireless microphones, earset style microphones were developed. The microphone was positioned near the performer's mouth with a boom that was supported by an earpiece that was positioned behind the performer's ear.

The earset style wireless microphone minimized the difficulties associated with the Lavalier style microphones. Unlike a Lavalier style microphone, the performer can feel when the microphone was detaching from behind the performer's ear. Also, because the microphone is positioned near the mouth from the earpiece positioned behind the ear, the performer's clothing does not rub against the microphone.

However, because the earpiece has been reduced in size to minimize the appearance on the performer, the cable that transmits a signal from the microphone to a transmitter tends to detach due to strain placed upon a connection between the earpiece and the cord. When the cord detaches from the earpiece, the microphone does not transmit a signal to the amplification system and consequently fails to amplify the speaker's voice.

SUMMARY OF THE INVENTION

The present invention includes an earset microphone having an earpiece with a wedge portion wherein the wedge portion is positioned between a backside of the ear and a scalp to secure the earpiece in a selected position. A mounting bracket is positioned within the wedge portion. A boom is secured to the mounting bracket and extends from the earpiece such that the boom positions from below an ear lobe towards a mouth of the speaker. A microphone is positioned at the distal end of the boom proximate the speaker's mouth such that the microphone converts the speaker's voice into an electronic signal. An end of a cable is secured to the mounting bracket such that the cable remains secured to the mounting bracket during use and wherein the cable transfers the signal from the microphone to an external component.

DETAILED DESCRIPTION OF THE PREFERRED EMBODIMENTS

Figure 1:
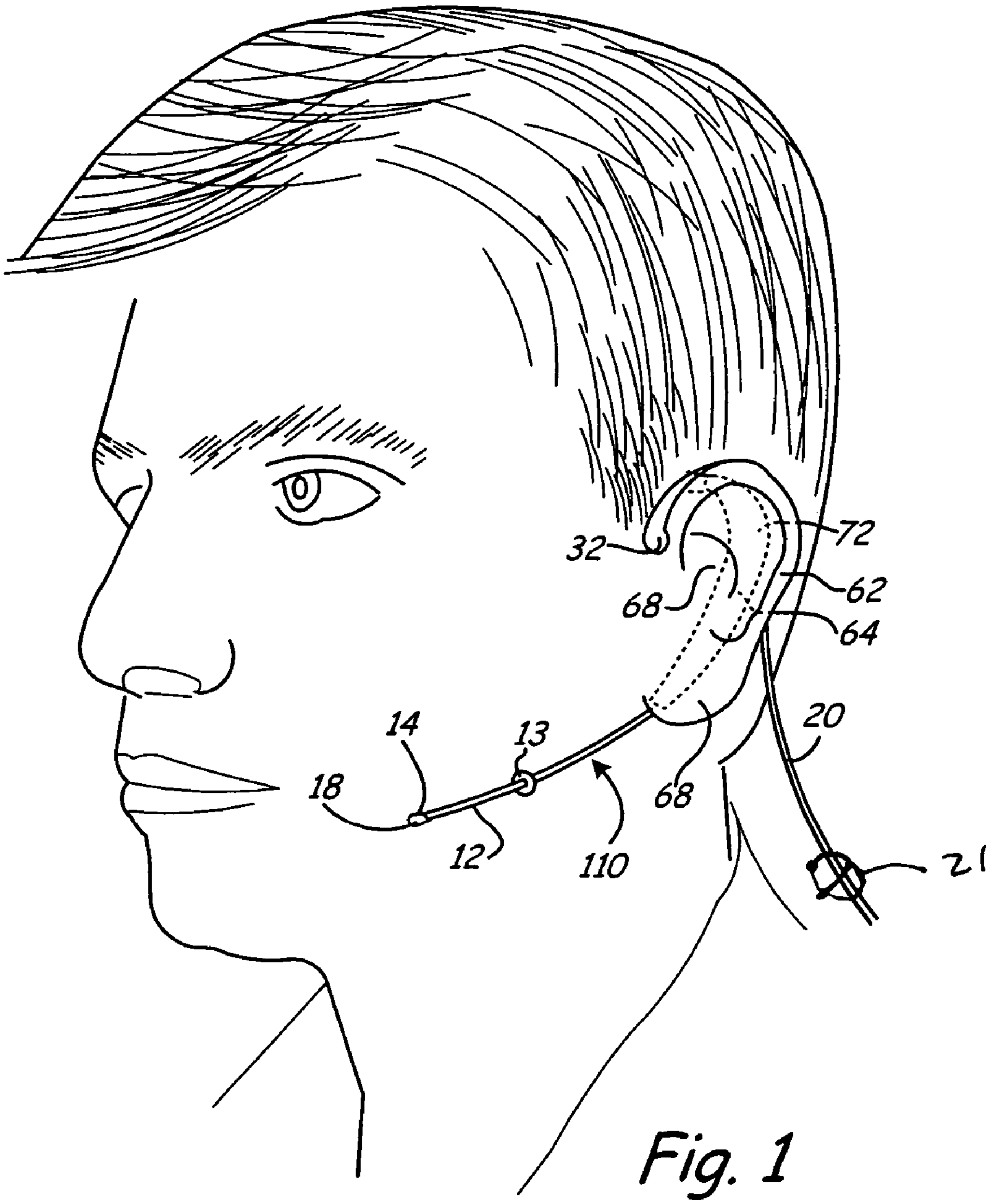
FIG. 1 is a perspective view of an earset microphone of the present invention being worn by a user.

An earset microphone of the present invention is generally illustrated in FIG. 1 at 10. The earset microphone 10 includes a microphone 18 that is attached to a distal end 14 of a boom 12. The microphone 18 is positioned proximate a speaker's mouth 60 to accept sound waves created by the speaker's voice. The microphone 16 converts the sound waves into an electric signal that is transmitted through wires positioned within a through bore in the boom 12 to a cable 20. The cable 20 connects the earset microphone 10 to a transmitter (not shown) that sends the signal to an amplification system (not shown).

Figure 2:
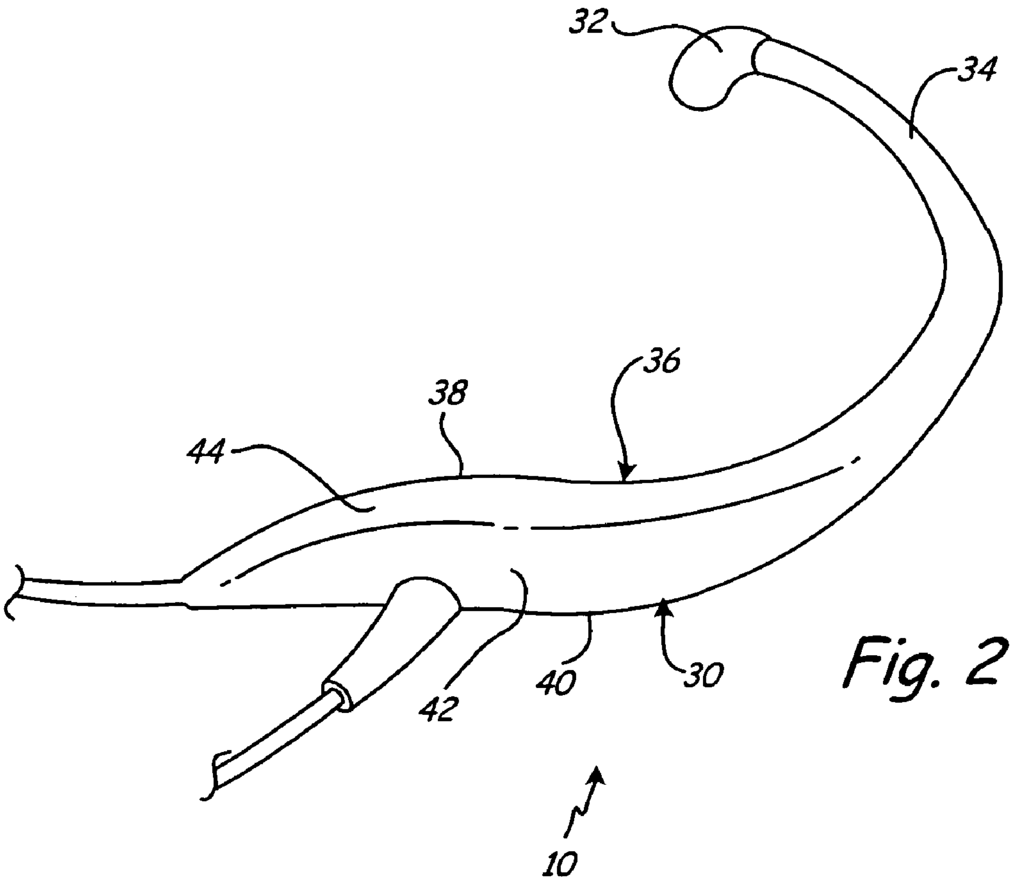
FIG. 2 is a perspective view of the earset microphone of the present invention.

Referring to FIGS. 1 and 2, the earset microphone 10 includes an earpiece 30 that has a generally arcuate configuration. The earpiece 30 is secured in a selected position between a back-side 64 of the ear 62 and the scalp 72 while a speaker is speaking.

Figure 5:
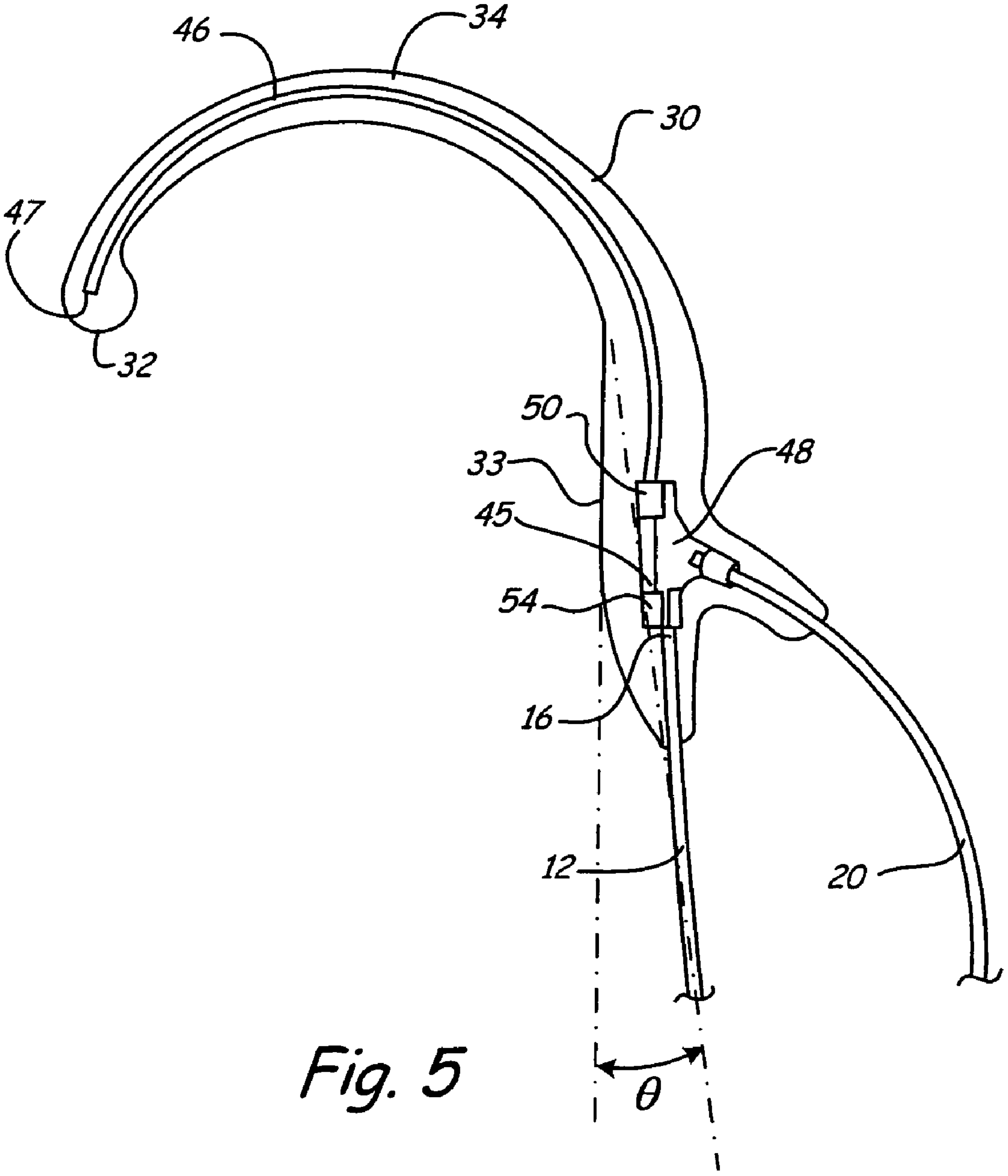
FIG. 5 is a cutaway view of the earset microphone of the present invention.
Figure 6:
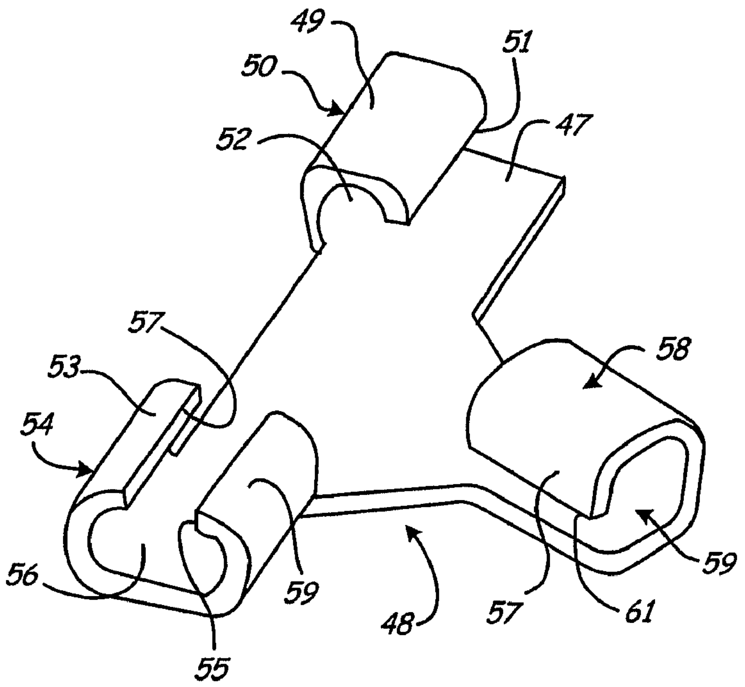
FIG. 6 is a perspective view of a connecting bracket of the present invention.
Figure 7:
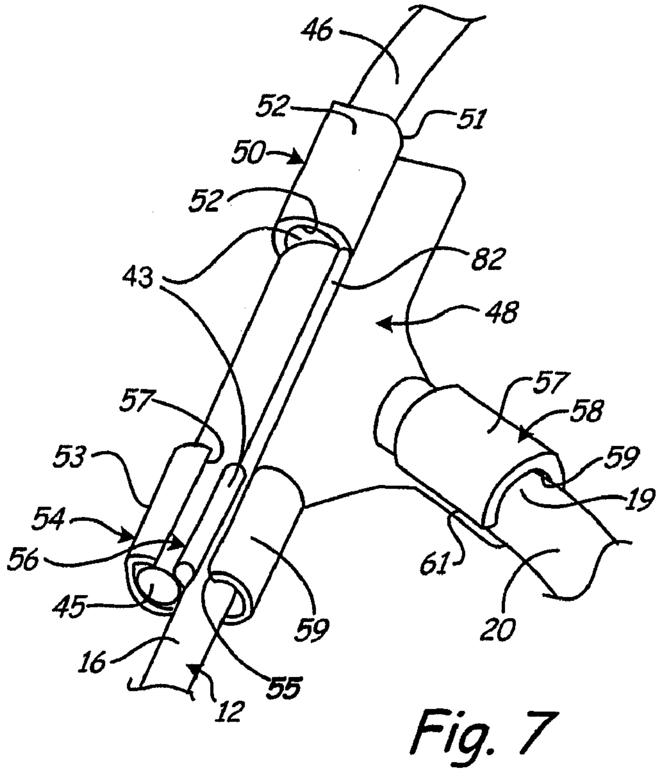
FIG. 7 is a perspective view of the connecting bracket of the present invention having wiring attached thereto.

Referring to FIGS. 5-7, the earpiece 30 is molded about a substantially V-shaped bracket 48 having retaining mechanisms that frictionally engage and secure the boom 12 and the cable 20 within the earpiece 30. The robust engagement of the boom 12 and the cable 20 with the V-shaped bracket 48 retains the boom 12 and the cable 20 to the earpiece 30 even when atypically high stresses and strains are placed on either the boom 12 and/or the cable 20.

The cable 20 is secured to the V-shaped mounting bracket 48 by positioning an end 19 of the cable 20 within a channel 59 of a side clamp 58 defined by a generally "U"-shaped body 57. The generally "U"-shaped body 57 has one end attached to the V-shaped bracket 48 and a distal end 61 spaced apart from an upper surface 47 of the v-shaped bracket 48. The end 19 of the cable 20 is frictionally secured within the side clamp 58 by constricting the channel 59 by forcing the distal end 61 toward the upper surfaces 47 of the V-shaped bracket 48.

The frictional engagement of the side clamp 58 and the end 19 of the cable 20 crimps the cable 20 within the side clamp 58 such the cable 20 will not detach from the side clamp 58 during typical usage or more rigorous usage when the stresses and strains on the attachment between the cable 20 and the earpiece 30 are increased. While the clamp 58 is the preferred mechanism for retaining the cable 20 within the earpiece 30, other fastening mechanisms are within the scope of the present invention.

The cable 20 is preferably a 1.5 mm diameter cable. However, other types of signal transmitting materials, including other types and sizes cables, are also within the scope of the present invention.

Referring to FIG. 1, the cable 20 also may include a connector 21 between the earset microphone 10 and the transmitter (not shown). The connector 21 allows the performer to exchange either the earset microphone 10 or the transmitter (not shown) provided either component has a malfunction.

Referring to FIGS. 6 and 7, the boom 12 is secured to the V-shaped bracket 48 by first positioning a proximal end 16 of the boom 12 within a channel 56 in a lower clamp 54 on the V-shaped bracket 48. The lower clamp 54 includes generally "L" shaped portions 53, 59 having distal ends 55, 57 respectively, spaced apart from each other.

A proximal end 45 of a support wire 46 is positioned within the channel 56 of the lower clamp 54 along with the proximal end 16 of the boom 12. The support wire 46 extends from the lower clamp 54 and through a channel 52 in an upper clamp 50 on the V-shaped bracket 48.

The proximal ends 16, 45 of the boom 12 and the support wire 46, respectively, are secured within the lower clamp 54 by applying force to the lower clamp 54 such that the distal ends 55, 57 of the "L" shaped portions 59, 53, respectively, are forced toward each other such that the channel 56 constricts to frictionally secure the proximal ends 16, 45 of the boom 12 and the support wire 46, respectively, therein. The proximal end 45 of the support wire 46 is optionally coupled to the boom 12 in the lower clamp 54 with a bead of solder 43 that further secures the boom 12 within the earpiece 30. Typically, the bead of solder 43 is silver.

The boom 12 is preferably a 1 mm steel tube having a through bore through which wires 17 are positioned to transmit the signal from the microphone 18. Manual force is typically applied to the boom 12 to conform the boom 12 to the speaker's face. However, other materials of construction including a rigid boom 12 are within the scope of the present invention.

The support wire 46 is positioned within the lower clamp 54 and the upper clamp 50. The upper clamp 50 includes a generally "U" shaped body 49 having a proximal end attached to the V-shaped bracket 48 a distal end 51 spaced apart from the upper surface 47 of the bracket 48. A force is applied to the generally "U" shaped body 49 which causes the distal end 51 to move toward the upper surface 47 and constricts the channel 52. As the channel 52 is constricted the support wire 46 is frictionally secured therein. The support wire 46 is optionally retained to the upper clamp 50 with a bead of solder 43, preferably a silver solder.

Figure 8:
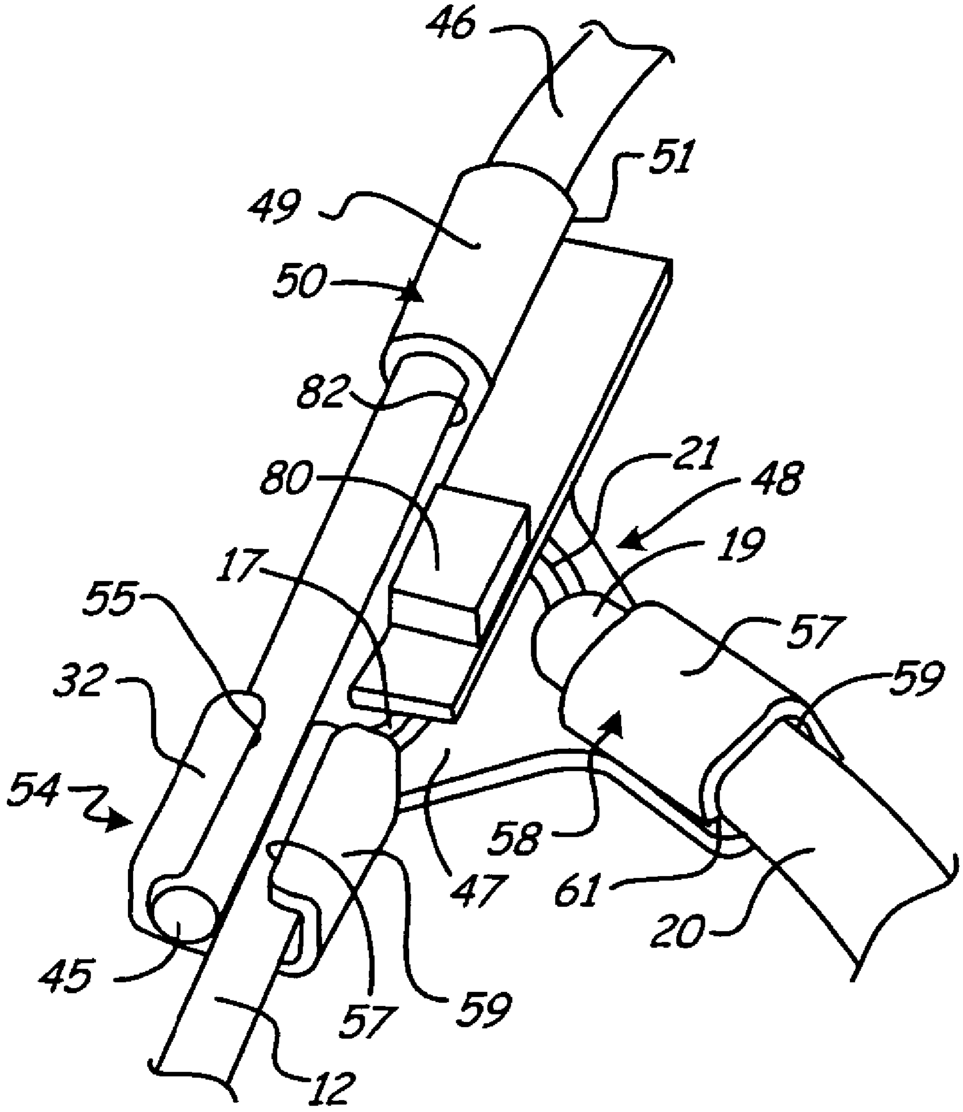
FIG. 8 is a perspective view of the connector of the present invention having wiring and a printed circuit board attached thereto.

Referring to FIG. 8, the rigorous attachment of the boom 12 and the cable 20 to the V-shaped bracket 48 allows the wires 17 that carry the electric signal from the microphone 18 through the boom 12 to be connected to soldering pads on a printed circuit board 80 that is attached to the upper surface 47 of the substantially V-shaped bracket 48. The printed circuit board 80 can contain a number of electrical circuits to perform functions utilized in the microphone art including but not limited to a voltage regulator, a signal amplifier, and an equalizer. The printed circuit board 80 transmits the processed signal to the cable 20 through a plurality of wires 21 attached to another solder pad on the printed circuit board 80. The cable 20 then transfers the signal to the transmitter (not shown).

Referring to FIGS. 7 and 8, a non-conductive wire 82 is typically positioned along a length of the support wire 46 and between the support wire 46 and the printed support board 80. The non-conductive wire 82 prevents the solder beads 43 from creating a short circuit on the soldering pads on the printed circuit board 80 such that the printed circuit board 80 functions properly during use.

Preferably, the V-shaped bracket 48, the upper clamp 50, the lower clamp 54 and the side clamp 58 are of a unitary construction. However, the clamps 50, 54, 58 can be attached to the bracket 48 in any suitable manner, including a weld.

Preferably the earpiece 30 is molded about the substantially V-shaped bracket 48 that secures the boom 12, the cable 20 and the support wire 46 in selected positions. During the molding process, the generally V-shaped bracket 48, the boom 12 the cable 20 and the support wire 46 are secured in selected positions within the earpiece 30.

The V-shaped bracket 48 is secured within a wedge portion 36 of the earpiece 30. By the term "wedge" is meant a configuration that is thickest at the juncture of the boom 12, the cable 20 and the support wire 46 by the bracket 48 and tapering to the outer surface proximate the boom 12 in a conoidal shape while also being conformed to fit behind the outer ear behind and slightly above the earlobe. The wedge thus not only provide a strong and durable connection but aids in retaining the earpiece microphone 10 in place.

Figure 3:
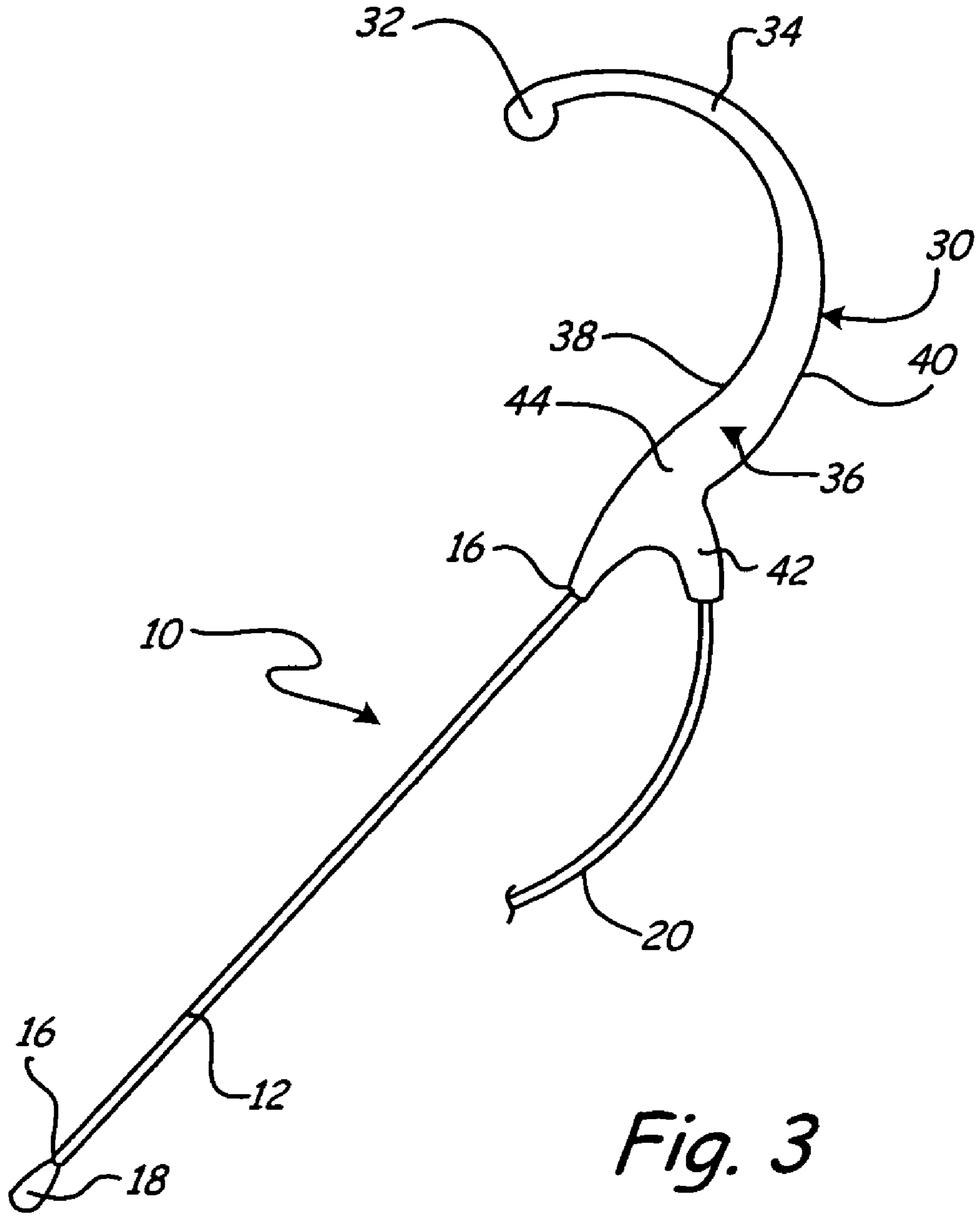
FIG. 3 is a side view of the earset microphone of the present invention.
Figure 4:
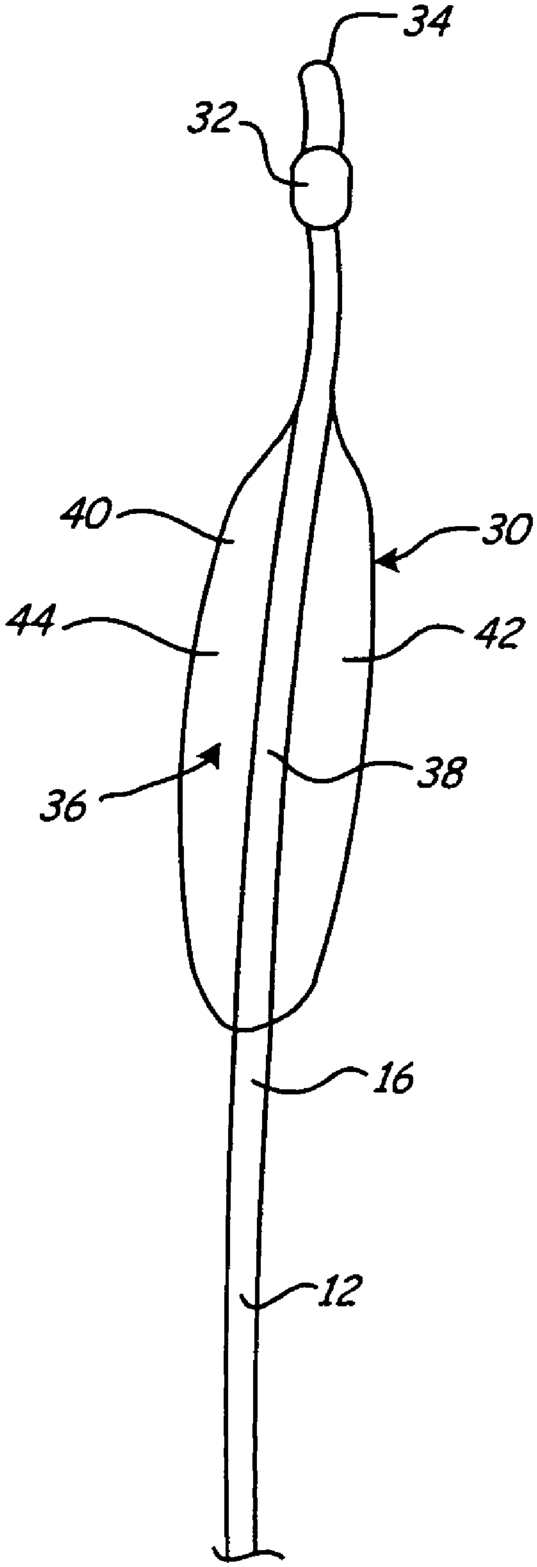
FIG. 4 is a front view of the earset microphone of the present invention.

Referring to FIGS. 2-4, the wedge portion 36 includes a narrow arcuate front surface 38 that is connected to a wider back surface 40 with side surfaces 42, 44. The thickness of the wedge portion 36 increases from the front surface 38 to the back surface 40 by increasing the distance between the side surfaces 42, 44.

An arcuate portion 34 extends from the wedge portion 36 and transitions to an end cap 32. The end cap 32 of the earpiece 30 has a substantially cylindrical configuration. The end cap 32 grips a top end 68 of the ear 62 by having a length greater than a distance between the top end 68 of the ear 62 and the scalp 72 such that the end cap 32 retains the end cap 32 to the ear 62. While the end cap 32 preferably has a cylindrical configuration, other configurations of the end cap 32 are within the scope of the present invention.

Referring to FIG. 5, the support wire 46 is positioned through an upper region of the wedge portion 36 and the arcuate portion 34 such that a distal end 47 is positioned proximate the end cap 32 of the earpiece 30. The support wire 46 preferably flexes such that the user can customize the fit of the earpiece 30 to the user's ear 62. The support wire 46 is preferably a 1 mm steel wire. However, other materials of construction for the support wire 46 are within the scope of the present invention.

Referring to FIGS. 1-4, the earpiece 30 secures to the ear 62 by positioning the end cap 32 above the ear 62, proximate where the top end 68 of the ear 62 joins the scalp 72. With the end cap 32 in the selected position, the earpiece 30 is rotated towards a position where the back side 64 of the ear 62 joins the scalp 72. As the front surface 38 of the wedge portion 36 nears the junction of the back side 64 of the ear 62 and the scalp 72, a distance between the side surfaces 42, 44 is greater than the distance between the back side 64 of the ear 62 and the scalp 72.

Figure 10:
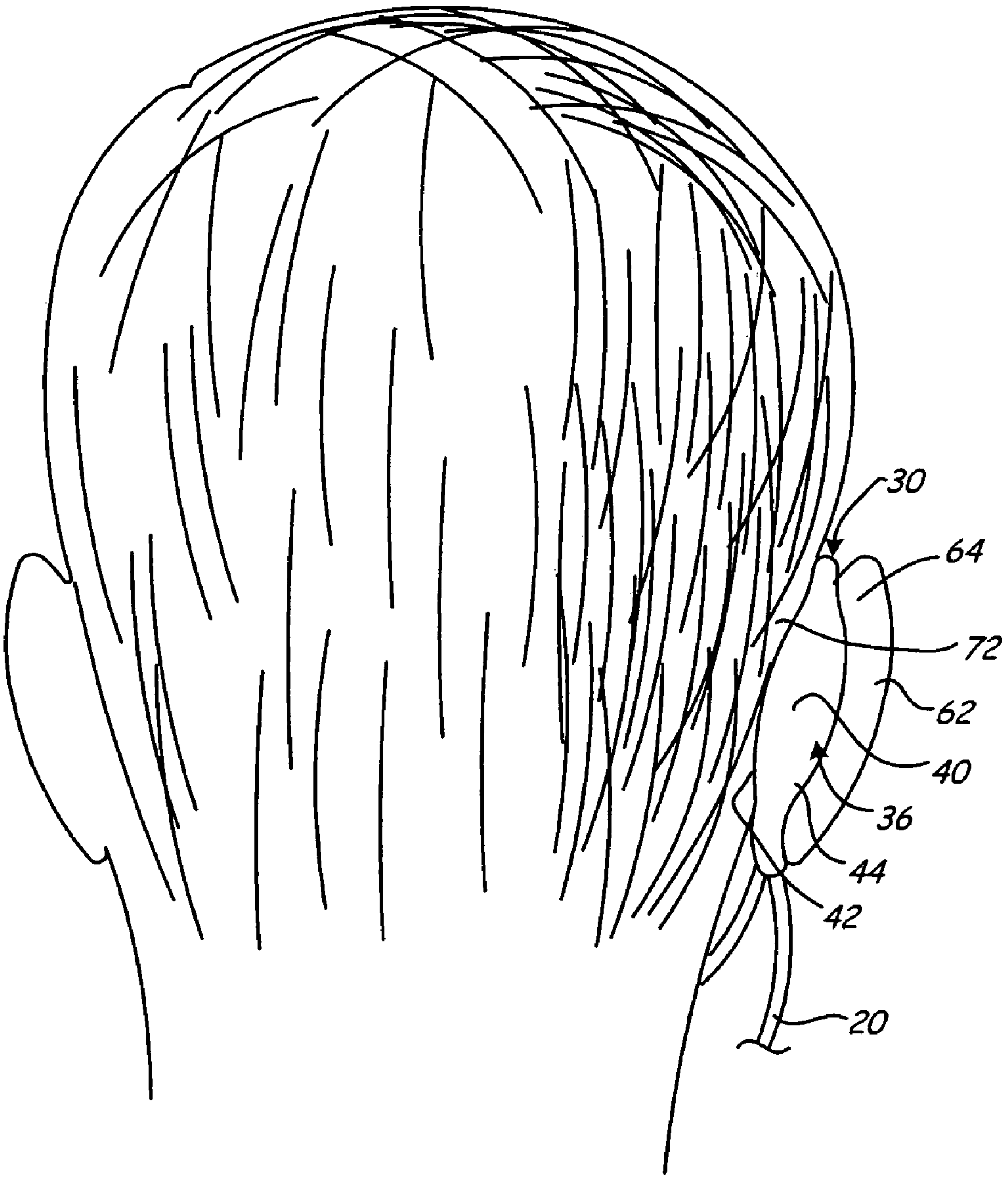
FIG. 10 is a back view of the earset microphone of the present invention being worn by the user.

Referring to FIG. 10, with the distance between the side surfaces 42, 44 of the wedge portion 36 greater than the distance between the back side 64 of the ear 62 and the scalp 72, the wedge portion 36 frictionally engages the back side of the ear 62 and the scalp 72 such that the wedge portion 36 retains the earpiece 30 to the ear 62. One skilled in the art will recognize that the end cap 32 alone, the wedge portion 36 alone, or the combination of the end cap 32 and the wedge portion 24 retains the earpiece 30 to the ear 62 such that the earpiece 30 is secured in the selected position.

The earpiece 30 is preferably constructed from a non-conductive plastic material that is molded into the selected shape. The non-conductive plastic preferably includes flexible characteristics such that the earpiece 30 conforms to the shape of the ear 62 to aid in retaining the earpiece 30 to the ear 62.

Other materials of construction are within the scope of the present invention including, but not limited to, natural and synthetic rubber, polymer materials and plastic materials. Non-flexible or rigid materials of construction are also within the scope of the present invention.

When the earpiece 30 is positioned in a selected position about the back side 64 of the ear 62, the boom 12 is at an angle θ from a plane defined by a side wall 33 of the earpieces as best illustrated in FIG. 5. With the boom 12 in the selected position relative to the side wall 33, and typically about 10° to the right of the plane defined by the side wall 33 for a right ear earset microphone, the boom 12 positions across the lower portion of the speaker's face below an ear lobe 68 proximate the corner of the mouth 60 as best illustrated in FIG. 1. An O-ring 13 may be optionally positioned about the boom 12 to space the boom 12 away from the user's face to allow perspiration to flow down the face and not flow down the boom 12.

When forming a left ear earset microphone, the V-shaped bracket 48 and the boom 12 are preferably molded into a selected position that is a substantially a mirror image of the earset microphone 10 designed for engaging the right ear. Preferably, the boom is about 10° left of a vertical plane defined by the side wall 33 of the earpiece 30 on an earset microphone 10 designed to engage the left ear.

Figure 9:
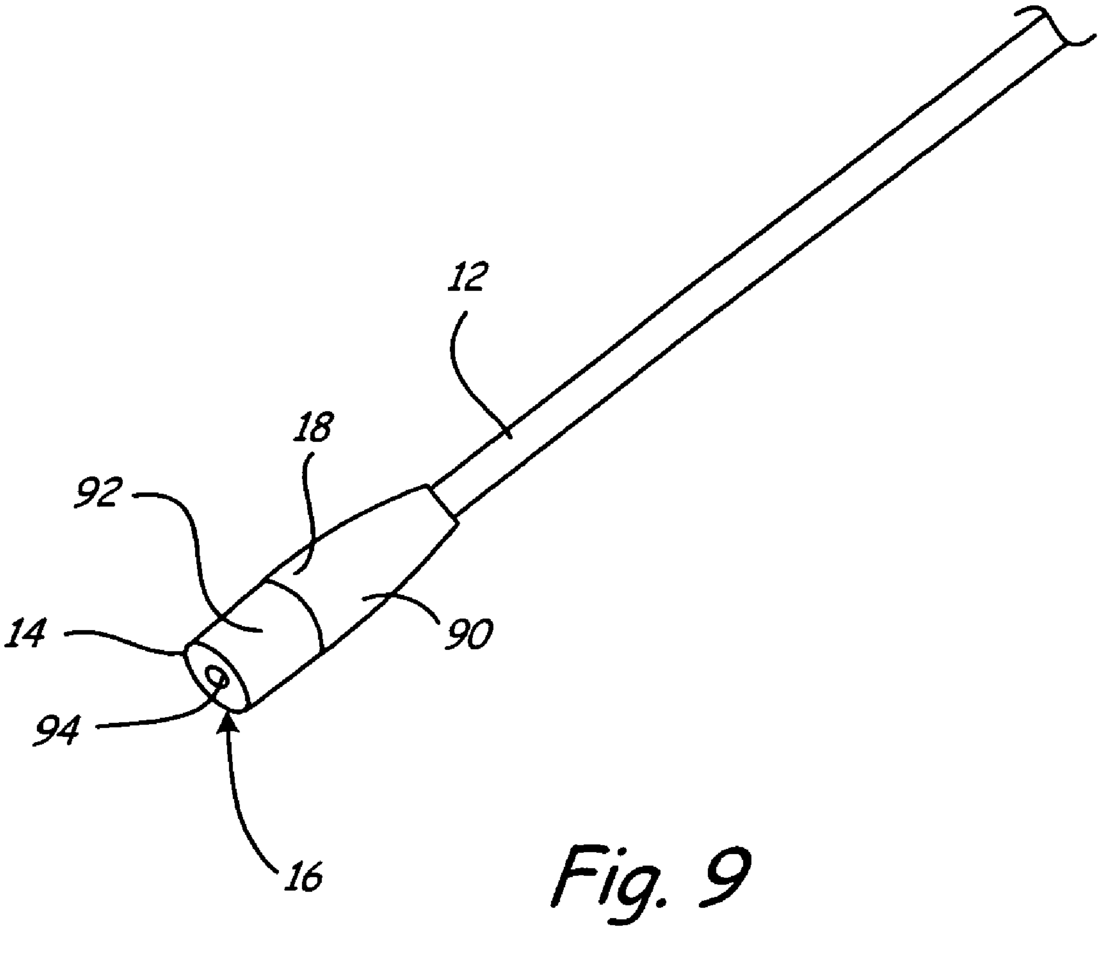
FIG. 9 is a perspective view of a boom supporting a microphone of the present invention.

Referring to FIG. 9, the microphone 18, positioned at the distal end 14 of the boom 12, is contained within a housing 90 that has a preferably tapered outer surface. The housing 90 is preferably constructed of polycarbonate, however other materials of construction are within the scope of the present invention. An end cap 92 secures the microphone 18 within the tapered housing 90. An aperture 94 in the end cap 92 allows sound waves to engage a diaphragm (not shown) of the microphone 18. The endcap 92 and the housing 90 are designed to minimize the visual impact of the microphone 18 on the performer's face. However, housings and end caps of alternative designs are within the scope of the present invention. A wind screen (not shown) may be positioned over the aperture 94 to minimize wind noise when the speaker is performing.

Utilizing a substantially straight boom 12 in the earpiece microphone 10 of the present invention minimizes the visual impact of the boom 12 on the performer's face because the boom 12 is located on the lower portion of the performer's face away from the front of the face which is the primary focus of the audience. The substantially straight boom 12 also provides cost savings and reduces the number of manufacturing steps required to produce the earset microphone 10. The earset microphone 10 of the present invention does not require a specially formed boom thereby reducing manufacturing costs for either the earset microphone manufacturer or the boom manufacturer.

An advantage of the earset microphone 10 of the present invention is the ability to utilize a substantially straight boom 12 extending from the earlobe 68 at an angle across the lower cheek to proximate a corner of the performer's mouth 60. Because a distance from the earlobe 68 to the mouth 60 is relatively consistent from one adult person to another, the earset microphone 10 of the present invention can be utilized by a significant portion of the populous without having to make adjustments to the length of the boom 12. The earset microphone 10 of the present invention substantially conforms to any adult human face.

Figure 1A:
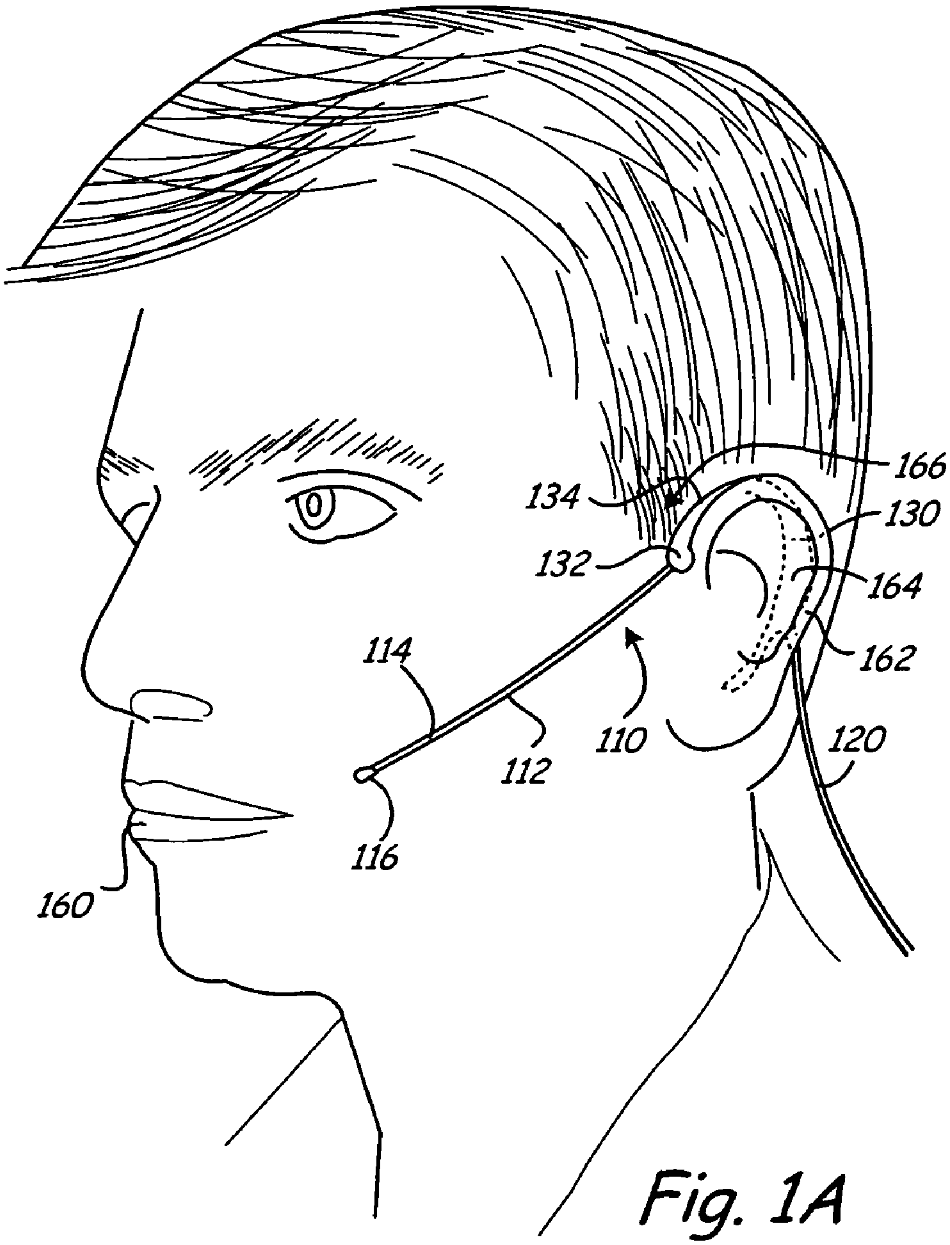
FIG. 1A is a perspective view of an alternative embodiment of an earset microphone of the present invention being worn by a user.

In an alternative embodiment illustrated in FIG. 1A at 110, the boom 112 extends from the end cap 132 positioned proximate the top 166 of the ear 162 toward the corner of the mouth 160. The boom 112 is substantially straight and extends from the end cap 132 to the corner of the mouth 160 such that the microphone 116 accepts the sound waves of the speaker's voice.

The earpiece 130 and the V-shaped bracket have a substantially similar construction as the embodiment 10. However, within the earpiece 130, the boom 112 has an arcuate configuration extending within the arcuate portion 134 and into the upper clamp (not shown). The wires (not shown) extend though the bore in the boom 112 and connect to the printed circuit board (not shown) where the printed circuit board (not shown) transmits the signal to the cable 120 that connects to the transmitter (not shown).

Although the present invention has been described with reference to preferred embodiments, workers skilled in the art will recognize that changes may be made in form and detail without departing from the spirit and scope of the invention.

What is claimed is:

1. An earset microphone comprising:

an earpiece comprising a wedge portion wherein the wedge portion positions between a backside of the ear and a scalp to secure the earpiece in a selected position;

a mounting bracket positioned within the wedge portion, a boom secured to the mounting bracket and extending from the earpiece such that the boom positions from below an earlobe towards a mouth of a speaker, a microphone positioned at a distal end of the boom proximate the user's mouth to convert the user's voice into a signal; and a cable for transferring the signal from the microphone to an external component and wherein the cable is secured to the mounting bracket within the wedge such that the cable remains secured therein during use.

2. The earset microphone of claim 1 and wherein the earpiece further comprises an arcuate portion extending from the wedge portion wherein the arcuate portion positions along the backside of the ear towards a top end of the ear.

3. The earset microphone of claim 2 and further comprising a support wire position within the arcuate portion wherein the support wire provides support and flexibility for conforming the earpiece to a configuration that engages the back side of the ear.

4. The earset microphone of claim 2 and further comprising an end cap attached to a distal end of the arcuate portion wherein the end cap engages the top end of the ear and retains the earpiece to the ear.

5. The earset microphone of claim 1 and wherein the boom comprises a tube having an internal bore along a length thereof.

6. The earset microphone of claim 5 and further comprising wires positioned through a length of the boom wherein the wires transmit the signal from the microphone.

7. The earset microphone of claim 1 and further comprising a printed circuit board attached to the mounting bracket and wherein the printed circuit board processes the signal from the microphone and transmits the processed signal through the cable.

8. The earset microphone of claim 7 and wherein the printed circuit board comprises a voltage regulating circuitry.

9. The earset microphone of claim 1 and wherein the earpiece comprises a polymeric material wherein the polymeric material flexes.

10. A mounting bracket for securing both a boom supporting a microphone and a cable for transmitting a signal to an external source within an earpiece of an earset microphone, the mounting bracket comprising:

a plate;

a first clamp attached to the plate and having a first clamping bore wherein the boom secures within the first clamping bore when the first clamp is positioned into a first clamping position; and a second clamp attached to the plate and spaced apart from the first clamp wherein the second clamp includes a second clamping bore and wherein the cable securably positions within the second clamping bore when the second clamp is positioned into a second clamping position.

11. The mounting bracket of claim 10 and wherein the first clamp comprises a generally U-shaped member having a distal end spaced apart from the plate by a slot and wherein the distal end moves towards the plate to position the first clamp into the first clamping position.

12. The mounting bracket of claim 10 and wherein the first clamp comprises:

a first L-shaped member extending from the plate having a first distal end; and a second L-shaped member from the plate and having a second distal end and wherein the distal ends are spaced apart wherein the first clamping member positions into the first clamping position by forcing the distal ends of the first and second L-shaped members toward each other.

13. The mounting bracket of claim 10 and wherein the second clamp comprises a generally U-shaped member extending from the plate and having a distal end spaced apart from the plate and wherein the cable positions within the second clamping bore and the distal end of the generally U-shaped member moves towards the plate to constrict the second clamping bore to position the second clamp into the second clamping position.

14. The mounting bracket of claim 10 and further comprising a printed circuit board secured to the plate wherein wires transmit a signal from the microphone through the boom to the printed circuit board and the printed circuit board modifies the signal and transfers the signal to the cable such that the signal is transmitted to an external amplification source.

15. The mounting bracket of claim 14 and wherein the printed circuit board comprises circuitry for regulating the voltage of the signal from the microphone.

16. The mounting bracket of claim 10 and further comprising a third clamp having a third clamping bore, the third clamp being attached to the plate wherein the third clamp is spaced apart from the first and second clamp.

17. The mounting bracket of claim 16 and wherein the third clamp substantially aligns with either the first clamp or the second clamp.

18. The mounting bracket of claim 16 and wherein the third clamp includes a substantially U-shaped member having a distal end spaced apart from the plate wherein the distal end moves towards the plate to constrict the third clamping bore and position the third clamp into a third clamping position.

19. The mounting bracket of claim 10 and wherein the mounting bracket is constructed of a stainless steel.

20. The mounting bracket of claim 10 and wherein the plate, the first clamp and the second clamp are of a unitary construction.

* * * * *